United States Patent [19]
Bhide et al.

[11] Patent Number: 5,557,770
[45] Date of Patent: Sep. 17, 1996

[54] DISK STORAGE APPARATUS AND METHOD FOR CONVERTING RANDOM WRITES TO SEQUENTIAL WRITES WHILE RETAINING PHYSICAL CLUSTERING ON DISK

[75] Inventors: Anupam K. Bhide, Stamford, Conn.; Daniel M. Dias, Mahopac, N.Y.

[73] Assignee: International Business Machines Corporation, Armonk, N.Y.

[21] Appl. No.: 36,636

[22] Filed: Mar. 24, 1993

[51] Int. Cl.⁶ ................................................. G06F 12/16
[52] U.S. Cl. ...................... 395/488; 395/497.04; 395/441
[58] Field of Search ..................................... 395/575, 600, 395/275, 425, 441, 497.04, 488, 439, 456, 419, 482, 480, 404

[56] References Cited

U.S. PATENT DOCUMENTS

| | | | |
|---|---|---|---|
| 5,081,548 | 1/1992 | Inazawa et al. | 360/72.2 |
| 5,297,258 | 3/1994 | Hale et al. | 395/275 |
| 5,321,832 | 6/1994 | Tanaka et al. | 395/600 |
| 5,367,410 | 11/1994 | McCarthy | 360/48 |
| 5,367,669 | 11/1994 | Holland et al. | 395/575 |
| 5,379,417 | 1/1995 | Lui et al. | 395/575 |
| 5,420,983 | 5/1995 | Noya et al. | 395/275 |

FOREIGN PATENT DOCUMENTS 9212482  7/1992  WIPO.

OTHER PUBLICATIONS

ACM Transactions On Computer Systems, vol. 10, No. 1, Feb. 1992, New York, USA, pp. 26–52, M. Rosenblum et al., "The Design and Implementation Of A Log–Structured File System".

Computer Architecture News, vol. 21, No. 2, May 1993, New York, USA, pp. 64–75, XP000380355, D. Stodolsky et al., "Parity Logging, Overcoming The Small Write Problem On Redundant Disk Arrays".

*Primary Examiner*—Jack B. Harvey
*Assistant Examiner*—Ario Etienne
*Attorney, Agent, or Firm*—Ronald L. Drumheller

[57] ABSTRACT

A high performance disk subsystem has a disk write mechanism that provides high throughput for random disk writes by dividing the disks into a data portion and a log portion. A fault-tolerant memory in the disk controller is used to temporarily store data blocks or pages which are to be written in the data portion of the disks. The updated blocks are sorted in the fault-tolerant memory in accordance with their physical home location on the data portion of the disks. Sorted runs are temporarily written out to the log portion of the disk. In a parallel process, sorted runs are retrieved from the log portion of the disks, merged in the fault-tolerant memory, and written out to their home location on the data portion of the disks, which converts random disk writes to largely sequential I/O while retaining physical clustering of the data on disk.

14 Claims, 7 Drawing Sheets

DISK STORAGE APPARATUS AND METHOD FOR CONVERTING RANDOM WRITES TO SEQUENTIAL WRITES WHILE RETAINING PHYSICAL CLUSTERING ON DISK

FIELD OF THE INVENTION

This invention relates generally to digital storage systems for electronic computers and more specifically to a disk storage method and apparatus wherein a logging and sorting mechanism is used to provide higher performance by converting disk write operations having random addresses largely into disk write operations in a sequential address order.

BACKGROUND OF THE INVENTION

As the requirements for On-Line Database Transaction Processing (OLTP) grow, high transaction rates on the order of thousands of transactions per second must be supported by OLTP systems. In applications such as OLTP, a large fraction of the requests are random accesses to data. Since a large fraction of the data resides on disks, the disk sub-systems must therefore support a large rate of random accesses, on the order of several thousands of random accesses per second.

Random disk Input/Output (I/O) performance is not improving at the same rate as other system parameters such as CPU MIPS. Therefore, applications such as OLTP, where random access to data predominates, are disk arm bound and the disk cost is becoming a larger fraction of the system cost. Thus, there is a need for a disk sub-system which can support a large rate of random accesses per second with a better price-performance characteristic than for traditional disk systems.

In a paper by M. Rosenblum and J. Ousterhout, entitled "The Design and Implementation of a Log-Structured File System", Proceedings of the Thirteenth ACM Symposium on Operating System Principles (October 1991), the basic observation is made that sequential disk I/O performance is improving because of increases in disk surface density, even though random disk I/O performance is not improving at the same rate. Therefore, Rosenblum and Ousterhout have proposed a solution that replaces random writes with sequential writes. More specifically, a log-structured file system is proposed that writes updates to a sequential log. Subsequently, garbage collection and compaction are used to create large free areas on disk.

A basic problem with this method is that clustering of data on the disk is lost. That is, by remapping a page (or block) of data to another location on disk, previously adjacent pages (or blocks) are moved to arbitrarily distant locations on disk. As a consequence, a later sequential reading of those formerly adjacent pages (or blocks) will require access to spaced apart locations on the disk (i.e., formerly sequentially accessed read operations will be converted into randomly accessed read operations).

While random accesses for reading is predominant in OLTP applications, significant sequential accesses also exist. For example consider the "Transaction Processing Council Benchmark C (TPC-C), Standard Specification, Revision 1.0", Edited by Francois Raab (Aug. 13, 1992). In the TPC-C benchmark, one of the transaction types is an order transaction that creates a table of customer orders. Later, a delivery transaction processes the oldest unsatisfied orders sequentially in a batch transaction. This leads to significant sequential access to the data in addition to the predominant random access. Further, queries against a database often access data via a table-space scan that is accessed in clustering order, i.e. according to the specific order on disk.

SUMMARY OF THE INVENTION

Accordingly, it is an object of this invention to provide a disk-subsystem that has improved performance for random disk I/O by converting random disk write I/O to largely sequential I/O.

It is also an object to retain the physical clustering of the data on the disk (i.e., that data on disk is not permanently re-mapped to another physical location on disk just because the data has been updated).

It is still another object to provide a high performance disk sub-system that can recover from a failure of a processor or a disk.

These and further objects and advantages are achieved by this invention by providing a disk I/O system in which updates (i.e., writes) to disk are stored temporarily in a fault-tolerant memory in a disk controller, where they are also sorted into successive runs of updates, the sorting being done in accordance with the home locations of the updates on disk. Each sorted run is then written sequentially onto a log area of the disk(s). In parallel with this activity, at least one run (and preferably a multiplicity of such runs which are merged to form a much larger run in the same sorted order) is written back to home location on the disk. Because the updates are written back to home location in accordance with the physical order on disk, the writes to home location are done largely in sequential order. Using this method, random writes to the disk are converted to largely sequential writes to disk and clustering of data on the disk is preserved.

BRIEF DESCRIPTION OF THE DRAWINGS

These, and further, objects, advantages, and features of the invention will be more apparent from the following detailed description of a preferred embodiment and the appended drawings in which.

DESCRIPTION OF A PREFERRED EMBODIMENT

Figure 1:
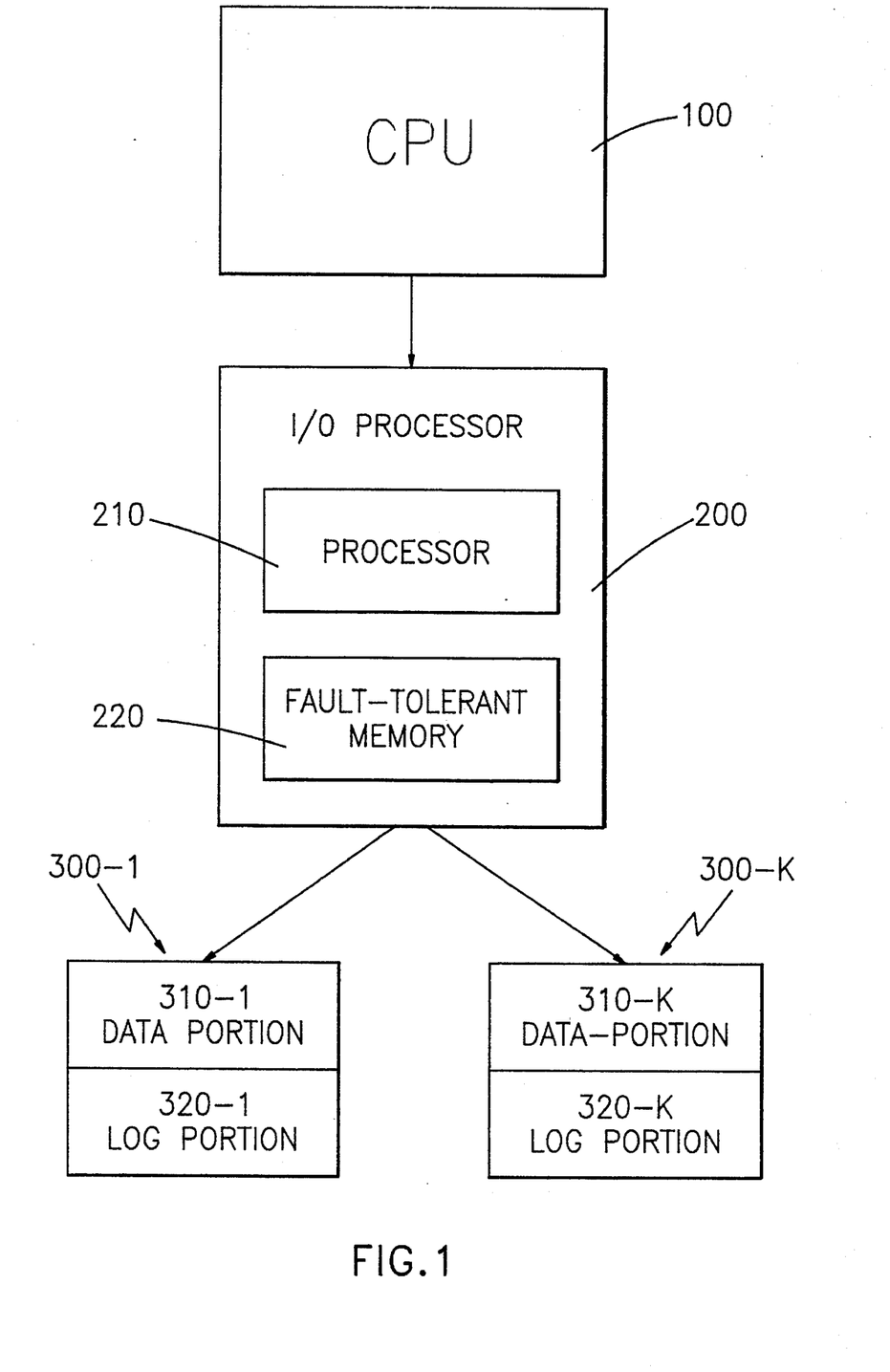
FIG. 1 is an overall block diagram of a preferred embodiment of this invention.

FIG. 1 is a block diagram of a preferred embodiment of this invention, which we have called a LogDISK (LDISK) subsystem. It consists of an Input/Output Processor (IOP) 200 and a number of disks 300-1 through 300-k. The IOP in turn is connected to a CPU 100. The IOP has a processor 210 and a fault-tolerant memory 220. Each disk is divided into two portions: one portion (called the data portion) acts as the home location for data blocks that reside on that disk and is labelled 310-1 for disk 300-1 (and 310-k for disk 300-k). The other portion (called the log portion) is used to store updates to data blocks on that disk and is labelled 320-1 for disk 300-1 (and 320-k for disk 300-k).

Figure 2:
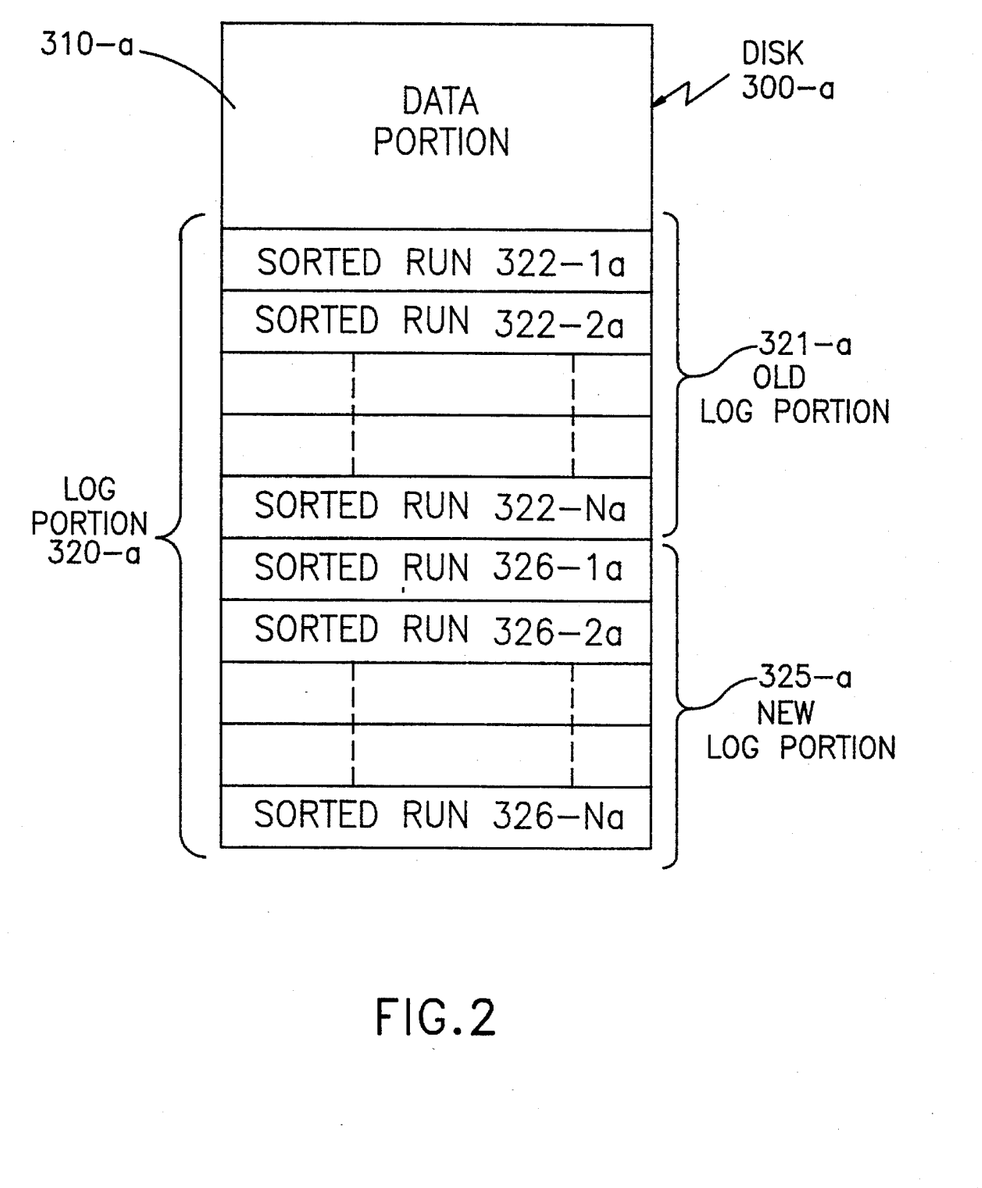
FIG. 2 illustrates a preferred organization of a single disk in accordance with this invention and shows how the disks are logically each organized into a data portion and a log portion.

FIG. 2 shows a block diagram of stored information on a single disk 300-a. The log portion 320-a is shown divided into two parts: one is the new log portion 325-a in which new disk writes are stored and the other is the old log portion 321-a in which writes were stored in a previous cycle of this method and are now being applied to the home locations. The new log portion 325-a in turn consists of a set of areas, 326-1a through 326-Na, where individual sorted runs of modified data blocks are stored. Each of these sorted runs of modified data blocks has been sorted by physical position (i.e., address) of the corresponding data block in the data portion of the disk. Similarly, the old log portion 321-a consists of a set of areas, 322-1a though 322-Na, where a previous set of sorted runs of modified data blocks are stored. The number of sorted runs N in each portion is arbitrarily determined by the amount of space on the disk allocated to the total log portion 320-a. It is not necessary that the number of runs in each portion be the same or that the number of runs in each portion remain constant. Also, while the data blocks in the sorted runs are called "modified" data blocks, this phrase is intended to mean only that these data blocks are intended to permanently replace counterpart data blocks stored in the data portion. Accordingly, while any one or several or all of them might be different from the data blocks they are intended to replace, it is not necessary that all or even any of them be different or modified in fact.

Figure 3:
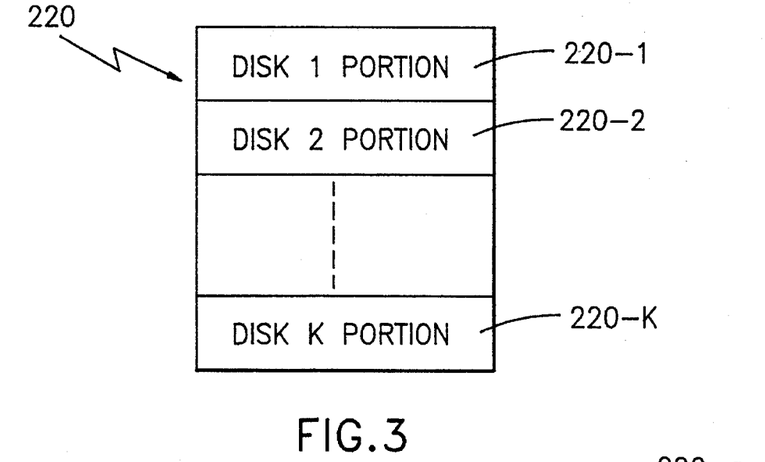
FIG. 3 schematically illustrates how the data in the fault-tolerant memory is organized for different disks.

FIG. 3 shows that the fault-tolerant memory 220 is divided into portions 220-1 through 220-k, with each portion being allocated to one disk.

Figure 4:
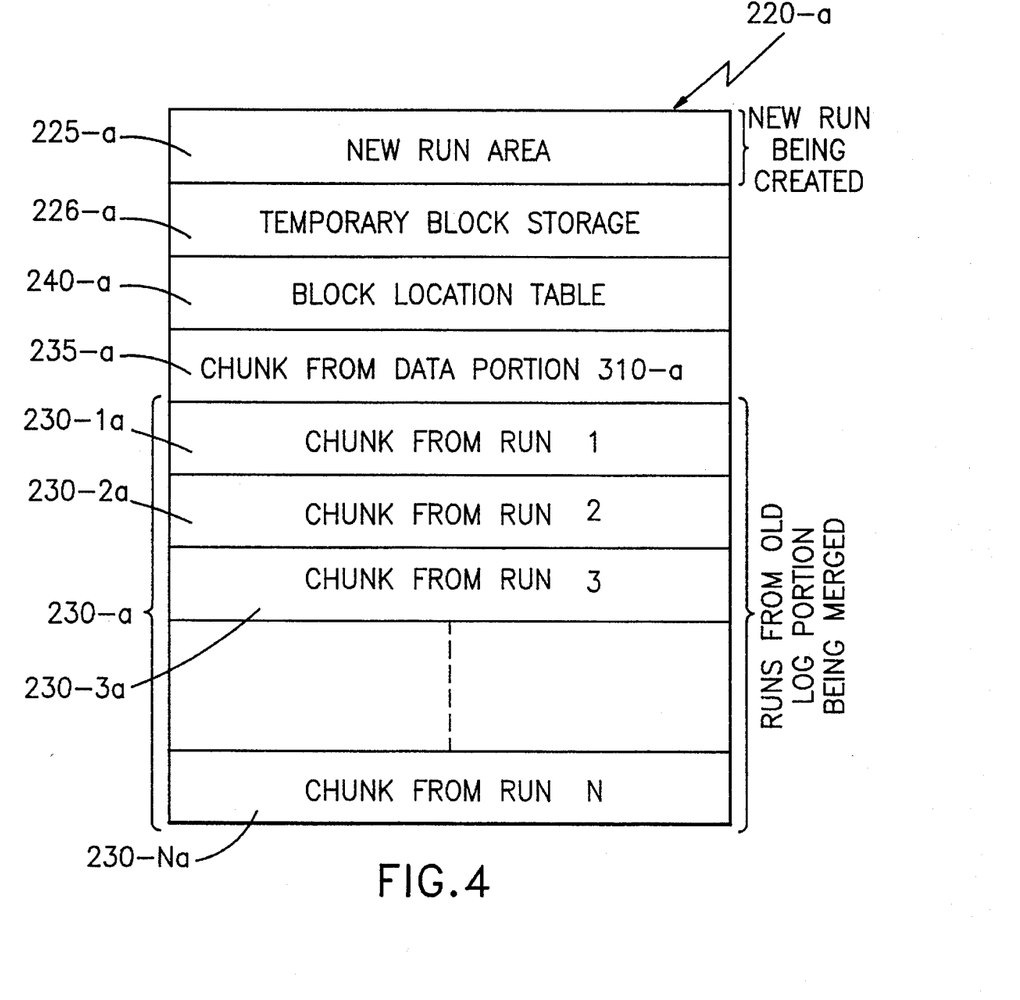
FIG. 4 schematically illustrates how the data in the fault-tolerant memory is organized with respect to a single disk.

FIG. 4 shows that the fault tolerant memory portion 220-a for disk a is divided further into several parts: a sorted run is being created in area 225-a of one part, which will be written later when finished as a sorted run to the new log portion of the disk; in the another part 230-a of the fault-tolerant memory, a chunk (or piece) of each run in the old log portion has been copied. These chunks are stored in separate areas labelled 230-1a to 230-Na. These chunks are being merged and applied to their home locations on the data portion of disk 310-a.

In our LDISK sub-system, two processes take place in parallel. In one process, shown in FIGS. 6 and 7, new disk writes are stored in the fault-tolerant memory. They are sorted according to physical disk block address. One method of keeping a sorted list in memory is by inserting disk addresses of blocks that are updated into a tournament tree. This is taught, for example, by D. E. Knuth in his book entitled "Sorting and Searching" Volume 3 published by Addison-Wesley.

Figure 6:
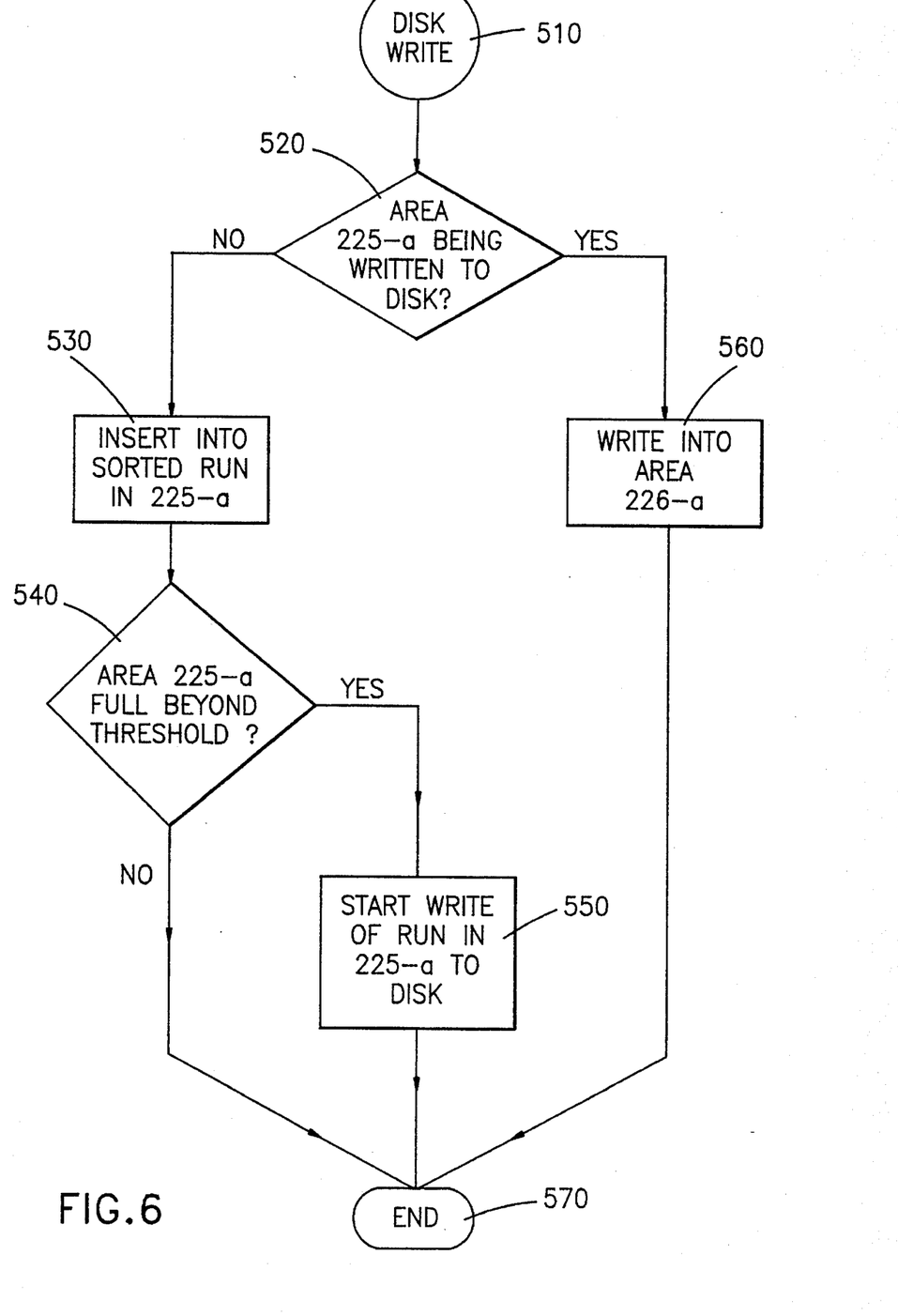
FIG. 6 is a flow chart which shows the steps involved when a write request is received.

When the portion of fault-tolerant memory allocated to storing this newly sorted run fills up beyond a certain threshold, the entire run is written to an area in the new log portion 325-a of the disk 300-a (see FIG. 2). Referring to FIG. 6, when a new disk write request is made to the LDISK sub-system, illustrated as block 510, a check is first made (block 520) as to whether or not the area of fault-tolerant memory allocated to the creation of the relevant new run (labelled as 225-a in FIG. 4) is in the process of being written out to disk. If so, the block to be written is stored in a temporary write area labelled as 226-a in FIG. 4, as shown by block 560 of FIG. 6, which ends the processing for the write request in this case.

If the test in block 520 of FIG. 6 is negative, (i.e., the sorted run area 225-a is not in the process of being written to disk), then the block with the write request is inserted into the sorted run being created in area 225-a of fault-tolerant memory, as shown in block 530 of FIG. 6. Those skilled in the art will appreciate that there are several known methods for maintaining a sorted run in area 225-a, such as building a tournament tree, or a heap, any of which may be used. If inserting the write block into area 225-a makes it's size cross a pre-determined threshold (tested in block 540 of FIG. 6), then a process is started to write the sorted run to disk as shown in block 550 of FIG. 6 and all of FIG. 7; otherwise the processing for the write is complete as shown in block 570 of FIG. 6.

Figure 7:
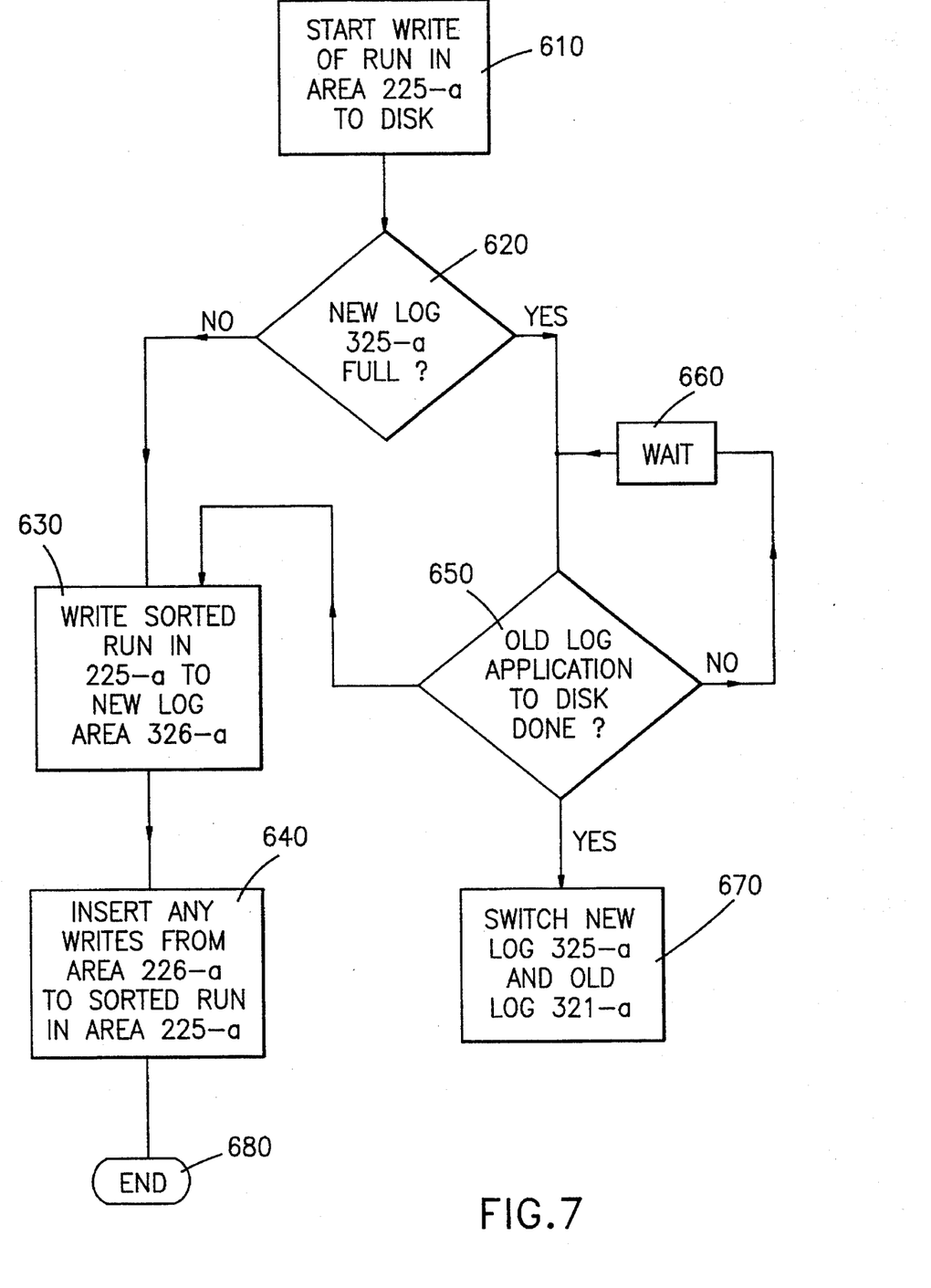
FIG. 7 is a flow chart which shows the steps involved in writing a sorted run in fault-tolerant memory to the new log area on disk.

FIG. 7 shows the process of writing a run from area 225-a of fault-tolerant memory (see FIG. 4) to the new log portion 325-a on disk (see FIG. 2). The process to write the run is started in block 550 of FIG. 6, as described above, and triggers the event in block 610 of FIG. 7. First, a check is made to determine if the new log portion 325-a is full (i.e. has accumulated a pre-determined number of runs N), as shown in block 620 of FIG. 7. If not (i.e., the new log portion is not full), then the pth run area 326-pa, $1 \leq p \leq N$ (see FIG. 2) is chosen and the sorted run in area 225-a of fault-tolerant memory is written to area 326-pa on disk, as shown in block 630 of FIG. 7. When this write is completed, any blocks that have accumulated in area 226-a of fault-tolerant memory (while the write of the sorted run to disk was being done) are inserted into the sorted run in area 225-a of fault-tolerant memory, as shown in block 640 of FIG. 7. For this case this completes the process of writing the sorted run to disk as indicated in block 680.

If the test in block 620 of FIG. 7 is positive (i.e., the new log portion 325-a is full), then in block 650 a check is made as to whether the (parallel) application of the old log to disk has been completed; if not, the write of the sorted run is delayed until the old log application is completed, as indicated in the loop in blocks 650 and 660. Those skilled in the art will appreciate that this delay can be accomplished using a semaphore, among other implementation options; alternatively, a small spare area can be used so that the write of the new log can be started before the old log application is completed. Once the old log application is completed, as shown in block 670 of FIG. 7, the new log portion 325-a and the old-log portion 321-a are interchanged, so that the previous new log becomes the old log and vice-versa. Then block 630 is entered and the sorted run is written to the new log area 326-pa, as described above.

In parallel, a first piece (or chunk) of each run in the old log portion is read into memory in area 230-a (FIG. 4). The first chunk of each run read into area 230-a is the chunk having the lowest (or alternatively the highest) order in the sort. A first chunk (or piece) also is read from the data portion 310-a of the disk 300-a (FIG. 2) and is placed in the fault-tolerant memory in area 235-a (FIG. 4). The first chunk read from the data portion 310-a also is the chunk having the lowest (or alternatively the highest) order in the sort (which is also the chunk having the lowest or highest physical position and/or address). The disk updates represented by the chunks in area 230-a are then merged, and the stream of updates applied sequentially to the in-memory chunk of the data blocks stored in area 235-a (FIG. 4). After the applicable portion from each chunk in area 230-a has been applied to the chunk of data blocks in area 235-a, the updated chunk in area 235-a is written back to the data area 310-a and a next data chunk is read into data area 235-a. The next data chunk is the next one in the order of the sort (and physical position and address). When a chunk in area 230-a from any run is exhausted (i.e., all of the modified data blocks in that chunk have been applied to the chunk (or successive chunks in area 235-a), an I/O operation is initiated to retrieve a next chunk from that run from the disk old log-portion 321-a. The next chunk is always the next one in the order of the sort.

Figure 8:
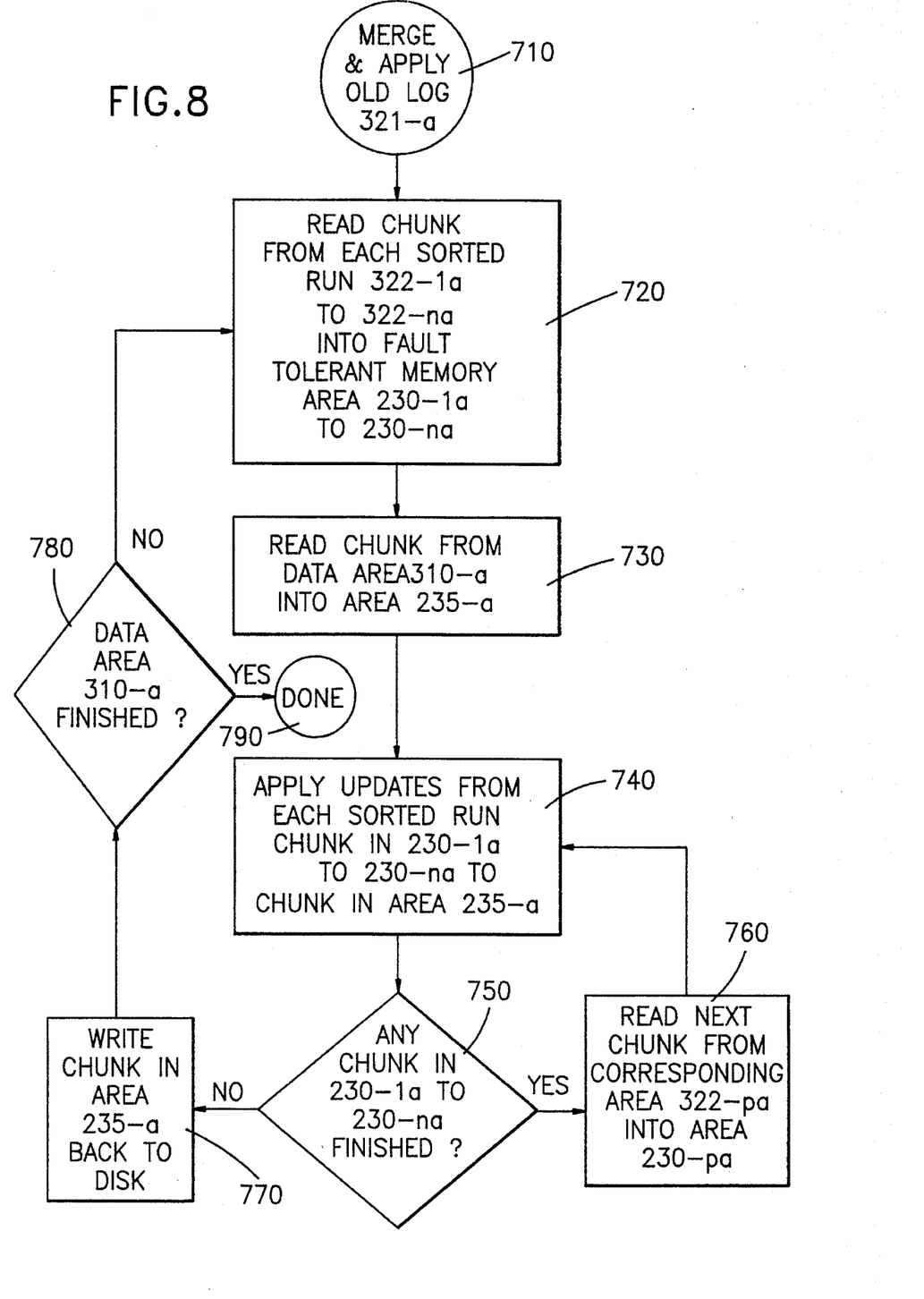
FIG. 8 is a flow chart which shows the steps involved in applying the old log area to the data portion of the disk.

The process outlined in the above paragraph will now be described in further detail. FIG. 8 shows a flow chart of the activities that take place. First, all the data areas are initialized. As shown in block 720, a chunk is read from each of the sorted runs in the old log portion 321-a into the corresponding area of fault tolerant memory part 230-a. Next, as shown in block 730, a chunk is also read from the disk data portion 310-a into fault tolerant memory area 235-a. As shown in block 740, updates from each sorted run chunk are then applied to the chunk in data area 235-a. If one of the sorted run chunks finishes, another chunk from the same run is read in from disk to replace it, as shown in block 750. Eventually, all the updates are applied to the chunk in data area 235-a. Then, that chunk is written back to disk as shown in block 770. If the data portion has been completely written, chunk-by-chunk, into area 235-a and copied back to data portion 310-a, then we are done, as shown in block 780. Otherwise, we read the next chunk from the data area 310-a into fault-tolerant memory area 235-a as shown in block 730 and continue.

The process of writing the new log portion of the disk is considered finished either when it exhausts all the disk space in the new log portion of the disk, or when it creates more runs than can be merged in memory by the other process in one pass. The process of merging the old log portion of the disk is considered finished when it has completed merging all the runs. When both processes are finished, the old and new log portions are swapped and the processes start all over again.

When the LDISK sub-system gets a read request for a given data block, the latest value of that block could lie in four different places:

1. it could still be in the fault-tolerant memory in the new run being constructed in area 225-a in FIG. 4.
2. it could lie in the new log portion of the disk, labelled 325-a in FIG. 2.
3. it could lie in the old log portion of the disk, labelled 321-a in FIG. 2.
4. lastly, it could be that the data block was not updated in the recent past and it lies in the data area portion of the disk, 310-a in FIG. 2.

An in-memory table, labelled 240-a in FIG. 4, is kept that indicates for each block of the disk, where the latest value of the block lies and the disk or memory address where the latest copy may be found. This table is updated any time the location of the latest value changes.

Note that reads are directed to either the home data location or the log (either in the new log area or old log area or new run area), depending on whether the required block was recently updated, using the in-memory table outlined in the previous paragraph. Therefore, sequential writes/reads in the above are interspersed with random reads. For efficient sequential I/O it is necessary to amortize disk seeks by writing/reading a large number of blocks in a chunk at a time. For instance, this could be a number of tracks, or a cylinder. There is a trade-off between the efficiency of the sequential I/O and the random read response time.

We will now compare the relative I/O rate that can be supported by the present invention and by normal disks. Let $\lambda$ be the I/O request rate and w the fraction of writes. Let the time taken for a single random request on a disk be $t_{ran}$. Let $t_{seq}^L$ be the average time per block needed to write a block to the log (amortized over the write of several tracks). Let $t_{seq}^D$ be the average time per block needed to write the sorted updated block back to home location. Then the average disk utilization is:

$$U_{disk}^{ourmethod} = \lambda \times (w \times (2 \times t_{seq}^L + t_{seq}^D) + (1-w) \times t_{ran})$$

In the above equation, the first term corresponds to applying the writes, and the second term corresponds to doing the random reads. Each logical write corresponds to three I/O operations: writing the newly updated block to the log, reading it from the log (to merge) and applying it to the home location. In this case, $$t_{seq}^L = \frac{(t_{seek} + \text{tracks\_amortized} \times t_{track\_write} + (\text{tracks\_amortized} - 1) \times t_{head\_switch})}{(\text{tracks\_amortized} \times \text{blocks\_per\_track})}$$

where tracks_amortized is the number of tracks that are written at a time.

Also, $$t_{seq}^D = t_{seq}^L \times \frac{D_{data}}{D_{lognew}}$$

where $D_{data}$ is the fraction of the disk that is used for data and $D_{lognew}$ is the fraction of the disk that is used for the new portion of the log. For a normal disk being used without this invention, the disk utilization is given by:

$$U_{disk}^{normal} = \lambda \times t_{ran}$$

The ratio of the number of disks required to support a certain transaction workload in the two alternative schemes is: $U_{disk}^{normal} / U_{disk}^{ourmethod}$.

Using typical values of parameters, $t_{ran}$=28 ms, tracks_amortized=5, blocks_per_track=8, $t_{head\_switch}$=1.0 ms, $t_{track\_write}$=16 ms, $t_{seek}$=18 ms, we get $$t_{seq}^L = 2.55 \text{ ms}$$

Suppose half the disk is used for data and half for log. Then: $t_{seq}^D = 2 \times t_{seq}^L = 5.1$ ms Therefore, the ratio of the number of disks required to support a certain workload in the two alternative schemes is:

$$U_{disk}^{normal} / U_{disk}^{ourmethod} = 28/((1-w) \times 28 + w \times 10.2)$$

For w=0.5, the ratio is 1.47. Suppose the blocks_per_track doubles to become 16 blocks/track. Then the ratio becomes 1.69. Note that with w=0.5, the best ratio possible is 2. Now as memory buffers become larger, it has been suggested that ratio of writes to reads as seen by the disk will increase. Therefore, in the limit considering w=1 gives a ratio of 11.

For sequential reads, the greater part of the data will be found by sequential reads to the data portion of the disk.

However, the "holes" in the data portion result in random reads to the log portion of the disk. The larger the log portion of the disk, the more efficient is our scheme for random writes. However, a larger log portion implies a larger number of "holes" in the data portion, with consequent degradation in sequential read performance. If the interface to the disk driver were changed, and if the order of blocks read is unimportant (e.g., in a table-space scan) then the data portion of the disk could be scanned first sequentially, and the "holes" read later. Another option is to consider a versioning scheme where the data portion is an old version of the data, while the new version is the combination of the data and log portions.

Application to RAID

In a Redundant Array of Inexpensive Disks (RAID) architecture, parity information is calculated and stored in such a way that if a disk fails, the information on that disk can be reconstructed from the other disks. Such schemes are described, for example, by D. Patterson, G. Gibson and R. Katz in "A Case for Redundant Arrays of Inexpensive Disks", Proceedings of the 1988 SIGMOD Conference. If this invention is naively applied to some RAID schemes, the performance will be poor. The naive application would have C disks, with a log portion for each disk, as discussed above, and with the parity for corresponding blocks across a stripe placed according to the parity striping scheme. The problem with this approach is that the logs would be written sequentially on each disk, but each log write would involve a (close to) random parity read-write cycle. The solution is to interleave the log across a stripe as in the RAID-5 design described by D. Patterson et al. in the above cited article. In this case, the interleaving would be at the track level, and C tracks in a stripe and the new parity precomputed and written once for the whole stripe, making the parity writes also sequential. A single log area is used to store the log updates for all the disks and this log area is interleaved across all the disks.

Sorting of the data portion of the disks could continue to be ordered by disk; however, this would still cause random writes of the parity during application of the sorted logs to disk. Therefore, our preferred solution is to interleave RAID-5 disks as a larger disk of N times the size, and interleave the data across disks as well as in the Patterson article cited above. In this case, sorting order is now the interleaved order across disks, i.e., track 1 disk 1, track 1 disk 2, . . . , track 1 disk N, track2 disk 1, and so on. With this ordering, the parity can be pre-computed while applying the sorted log to the data portion of the disk.

With the above method, all writes are converted to sequential writes across stripes of the arrayed disks. In this case there is no performance difference between RAID-5 and RAID-4 using the above scheme. (This is because the parity can be pre-computed and requires only one parity write for each data write in the stripe.)

Figure 5:
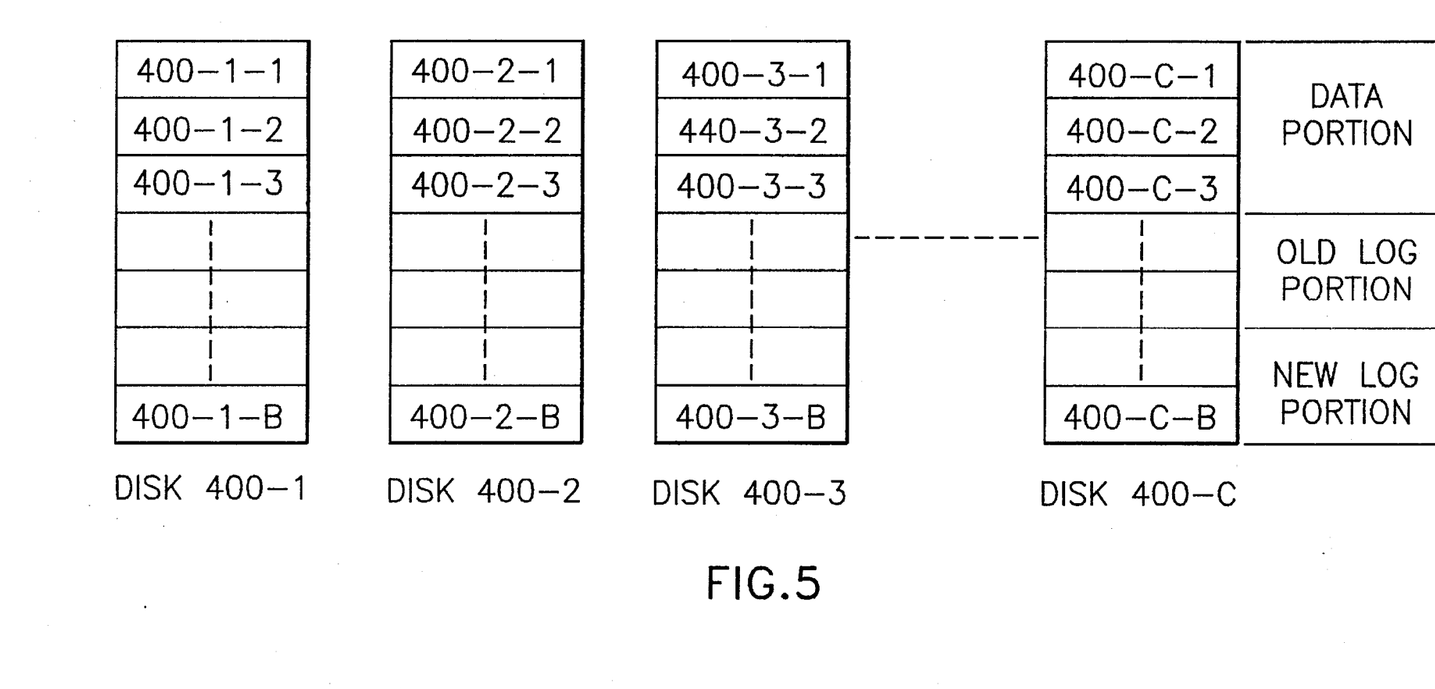
FIG. 5 schematically illustrates how this invention may be applied to a Reliable Array of Independent Disks (RAID) and shows how the RAID disks are logically organized into a data portion and a log portion.

The above organization is shown in FIG. 5. There are C disks in the array. Each disk is divided into three parts: the data portion, the old log portion and the new log portion. FIG. 5 shows each disk broken up into tracks. The data portion of the disk is considered to be 400-1-1, followed by 400-2-1, followed by 400-3-1, . . . , followed by 400-C-1, followed by 400-1-2 and so on. Thus, the RAID array is considered to be one big disk, divided into three portions, with the data of each portion striped across the disks and interleaved at the track level.

While the invention has been particularly shown and described with reference to a preferred embodiment thereof, it will be understood by those skilled in the art that various changes in form and detail may be made without departing from the spirit and scope of the invention.

We claim:

1. An improved disk system for storing data blocks of digital information for a computer system wherein said disk system provides to said computer system a copy of said data blocks that are requested by said computer system, and said computer system provides to said disk system a modified version of at least some of said data blocks provided by said disk system, said disk system updating stored data blocks corresponding to said modified data blocks provided by said computer system with said provided modified data blocks, comprising:

storage disk means logically partitioned into a data area and a log area, said data area being used for permanent storage of said data blocks, each said data block having a physical home location in said data area;

a controller for said storage disk means, said controller having a fault-tolerant memory;

said controller temporarily storing in said fault-tolerant memory said modified data blocks provided by said computer system;

means in said controller for sorting said provided modified data blocks in accordance with said physical home location of said provided modified data blocks to create a sorted run of modified data blocks and for temporarily storing said sorted run in said log area of said storage disk means; and means in said controller for reading said sorted run temporarily stored in said log area of said storage disk means and for updating said data blocks in said data area of said storage disk means with said sorted run;

whereby said data blocks in said data area are updated by said modified data blocks provided in any order by said computer system in accordance with the physical order of said data blocks in said data area.

2. The improved disk system as defined in claim 1 wherein said sorting means creates successive sorted runs of modified data blocks and a multiplicity of said successive sorted runs are stored temporarily in said log area of said storage disk means.

3. The improved disk system as defined in claim 2 wherein said controller further comprises means for merging a multiplicity of said sorted runs temporarily stored in said log area of said storage disk means and for updating said data blocks in said data area of said storage disk means with said merged multiplicity of sorted runs in an order corresponding with said physical home location of said data blocks in said data area.

4. The improved disk system as defined in claim 1 wherein said controller further comprises:

a table in said fault-tolerant memory for determining whether a data block requested by said computer system corresponds to a modified data block temporarily stored by said disk system either in said fault-tolerant memory or in said log area and not yet updated to said data area.

5. The improved disk system as defined in claim 4 wherein said table keeps track of the location in said disk system of the latest copy of said data blocks stored in said disk system.

6. The improved disk system as defined in claim 4 wherein said controller further comprises:

means for retrieving a latest copy of a data block requested by said computer system and stored by said disk system.

7. The improved disk system as defined in claim 1 wherein said storage disk means comprises a multiplicity of digital storage disks.

8. The improved disk system as defined in claim 7 wherein each of said digital storage disks is logically partitioned into a data portion and a log portion, said data area of said storage disk means comprising all of said data portions and said log area of said storage disk means comprising all of said log portions.

9. The improved disk system as defined in claim 1 wherein said storage disk means and controller comprise a RAID-5 system in which said data area is interleaved across a multiplicity of digital storage disks and said log area also is interleaved across said multiplicity of digital storage disks.

10. The improved disk system as defined in claim 9 wherein said interleaved data area and said interleaved log area are both interleaved at a track level.

11. The improved disk system as defined in claim 9 wherein said means for reading and updating copies said data blocks from said data area into said fault-tolerant memory one chunk at a time, updates said chunk in said fault-tolerant memory, and then copies said updated chunk back into said data area.

12. The improved method for storing data blocks of digital information in a disk store, said disk store providing to a computer system a copy of said data blocks requested by said computer system and said computer system providing back to said disk store a modified version of at least some of said data blocks provided by said disk store, said disk store updating stored data blocks corresponding to said modified data blocks provided by said computer system with said provided modified data blocks, comprising the steps of:

logically partitioning said disk store into a data area and a log area, said data area being used for permanent storage of said data blocks for said computer system, each said data block having a physical home location in said data area;

temporarily storing modified data blocks provided by said computer system in a fault-tolerant memory of a controller for said disk store;

sorting said provided modified data blocks in accordance with said physical home location in said data area of said data blocks corresponding to said provided modified data blocks to create a sorted run of modified data blocks and temporarily storing said sorted run in said log area;

reading said sorted run temporarily stored in said log area and updating said data blocks in said data area with said sorted run;

whereby said data blocks in said data area are updated by said modified data blocks provided in any order by said computer system in accordance with the physical order of said data blocks in said data area.

13. The improved method as defined in claim 12 wherein said sorting step creates successive sorted runs of modified data blocks and a multiplicity of said successive sorted runs are stored temporarily in said log area of said storage disk means.

14. The improved method as defined in claim 13 and further comprising the steps of merging a multiplicity of said sorted runs temporarily stored in said log area of said storage disk means and updating said data blocks in said data area of said storage disk means with said merged multiplicity of sorted runs in an order corresponding with said physical home location of said data blocks in said data area.

* * * * *